United States Patent
Mase et al.

(10) Patent No.: US 10,758,968 B2
(45) Date of Patent: Sep. 1, 2020

(54) MOLD SURFACE TREATMENT METHOD AND MOLD TREATED WITH SAID METHOD

(71) Applicant: FUJI MANUFACTURING CO., LTD., Tokyo (JP)

(72) Inventors: Keiji Mase, Tokyo (JP); Shozo Ishibashi, Tokyo (JP); Yusuke Kondo, Tokyo (JP)

(73) Assignee: FUJI MANUFACTURING CO., LTD., Tokyo (JP)

( * ) Notice: Subject to any disclaimer, the term of this patent is extended or adjusted under 35 U.S.C. 154(b) by 282 days.

(21) Appl. No.: 15/750,661

(22) PCT Filed: Aug. 11, 2015

(86) PCT No.: PCT/JP2015/072793
§ 371 (c)(1),
(2) Date: Feb. 6, 2018

(87) PCT Pub. No.: WO2017/026056
PCT Pub. Date: Feb. 16, 2017

(65) Prior Publication Data
US 2018/0229293 A1    Aug. 16, 2018

(51) Int. Cl.
*B22C 9/06*    (2006.01)
*B22C 9/18*    (2006.01)
(Continued)

(52) U.S. Cl.
CPC ............... *B22C 9/061* (2013.01); *B22C 9/06* (2013.01); *B22C 9/18* (2013.01); *B22D 17/22* (2013.01);
(Continued)

(58) Field of Classification Search
CPC .. B22C 9/06; B22C 9/061; B22C 9/18; B22D 17/22; B22D 17/2236; B24C 1/00; B24C 1/006
(Continued)

(56) References Cited

U.S. PATENT DOCUMENTS 9,108,298 B2    8/2015 Mase
9,156,131 B2   10/2015 Mase
(Continued)

FOREIGN PATENT DOCUMENTS

CN    102371542 A    3/2012
JP    200037732 A    2/2000
(Continued)

OTHER PUBLICATIONS

Corresponding Chinese Appl. No. 201580081735.4, Chinese Office Action dated Mar. 22, 2019.
(Continued)

*Primary Examiner* — Kevin P Kerns
(74) *Attorney, Agent, or Firm* — Cooper Legal Group, LLC; Ronald M. Kachmarik

(57) ABSTRACT

A method of treating a surface of a mold. The method includes forming dimples on a surface of a mold by ejecting substantially spherical ejection-particles so as to bombard the surface of the mold. The dimples are formed so as to satisfy a condition defined by the following formula:

$$1+3.3e^{-H/230} \le W \le 3+13.4e^{-H/1060}$$

wherein W is an equivalent diameter (μm) of the dimples and H is a base metal hardness (Hv) of the mold.

4 Claims, 4 Drawing Sheets

(51) Int. Cl.
  *B22D 17/22*  (2006.01)
  *B24C 1/00*  (2006.01)
  *B29C 33/38*  (2006.01)

(52) U.S. Cl.
  CPC ..... *B22D 17/2209* (2013.01); *B22D 17/2236* (2013.01); *B24C 1/006* (2013.01); *B29C 33/38* (2013.01); *B29C 33/3842* (2013.01)

(58) Field of Classification Search
  USPC .......................................................... 164/6
  See application file for complete search history.

(56) References Cited

U.S. PATENT DOCUMENTS

| 9,364,894 | B2 | 6/2016 | Hirano et al. |
| 2012/0043044 | A1 | 2/2012 | Mase |

FOREIGN PATENT DOCUMENTS

| JP | 2005014567 A | 1/2005 |
| JP | 2012-40744 | 3/2012 |
| JP | 2012-040744 A | 3/2012 |
| JP | 2012-183548 A | 9/2012 |

OTHER PUBLICATIONS

International Search Report to Corresponding International appl.: PCT/JP2015/072793, dated Oct. 20, 2015, 2 pages.
Corresponding Korean Appl., Korean Office action, Appl. No. 10-2018-7001172, dated Dec. 11, 2018.

MOLD SURFACE TREATMENT METHOD AND MOLD TREATED WITH SAID METHOD

TECHNICAL FIELD

The present invention relates to a method of treating a surface of a mold, and to a mold that has a surface treated by the method. More particularly, the present invention relates to a method of treating a surface of a mold enabling improved demoldability, and to a mold having a surface treated by this method to achieve excellent demoldability.

Note that in the present invention, a surface of a mold subject to treatment refers to a surface of a portion of a mold for which demoldability is desired, namely, to a surface of a portion that contacts molding material.

BACKGROUND OF THE INVENTION

In cases in which rough irregularities arise on the molding surfaces of a mold employed to mold metals and resins, such irregularities are transferred to the surface of a molded article (referred to below as "workpiece"). Thus, finishing of the surface of the workpiece is required after molding. In addition, because the surface of the workpiece engages with the irregularities on the surface of the mold, reducing the demoldability, productivity during molding decreases significantly. Moreover, there is a concern regarding deformation and damage to the workpiece due to the need to apply a strong force when demolding, and the rate of defects also increases.

Thus, the surfaces of a mold are normally finished smooth by hand polishing. This not only enables a smooth finish to be achieved on surfaces of the workpiece, but also secures demoldability.

However, along with molds having increasingly complex shapes, there is now a demand for shorter lead times for mold deliveries. The polishing of surfaces of molds by hand, which is both labor intensive and time consuming, is an impediment to meeting such demands, and causes an increase in mold fabrication costs.

Moreover, depending on the shape and material of the workpieces to be molded, the required demoldability is not always obtainable even when mold surface are polished to smooth surfaces.

Thus, various methods have been proposed to improve the demoldability of workpieces. For example, there is a proposal to increase the draft angle provided to cavities of molds, and there is moreover a proposal to perform surface treatment to enhance the slipperiness of surfaces of molds, e.g. by forming a fluorine based coating or a diamond-like carbon (DLC) film.

Furthermore, in contrast to making surfaces of molds smooth surfaces, there is also a proposal to form irregularities of a predetermined shape thereon. An example of this is a proposal for a "method of treating the surface of a cavity of a die used for casting" to improve fluidity while maintaining good release properties. In this proposal, spherical ejection particles of 100 to 1000 μm that have a hardness at least as hard as a casting mold are ejected against cavity surfaces of a casting mold to form semi-spherical dimples thereon (see claim 1 and claim 2 of Patent Document 1).

RELATED ARTS

Patent Documents

Patent Document 1: Japanese Patent No. 4655169

SUMMARY OF THE INVENTION

Problem to be Solved by the Invention

The reasons for treating a mold surface to make it smooth are not only that irregularities arising on the surface of a mold are transferred to the surface of a workpiece, and to prevent unnecessary irregularities from being formed. Another reason is to prevent a situation in which a workpiece is no longer removable from a mold (for example, a situation in which the workpiece is no longer able to be moved parallel to the molding surfaces of the mold) due to the engagement of irregularities on a mold surface with irregularities on a workpiece surface transferred from these irregularities formed on the mold surface.

Thus, as described in the conventional technology of Patent Document 1, although a configuration in which angular irregularities are formed on cavity surfaces of a mold to raise the fluidity achieves an improvement in fluidity, there is a deterioration in demoldability.

In contrast thereto, the configuration described in Patent Document 1, in which semi-spherical dimples are formed on the cavity surfaces of a mold, achieves good demoldability while also obtaining enhanced fluidity due to there being no angular irregularities present and due to release agent pooling inside the dimples (see paragraphs [0004] to [0007] in Patent Document 1 cited above).

However, results of testing by the inventors of the present invention have confirmed that merely forming dimples on the surface of a mold results in a limited demoldability related effect. Even though a mold subjected to the surface treatment by the method described in Patent Document 1 cited above achieves an improvement in demoldability compared to a mold having angular irregularities formed to the cavity surfaces, a great improvement in demoldability is not achieved when compared to ordinary molds that have been finished smooth.

Figure 1:
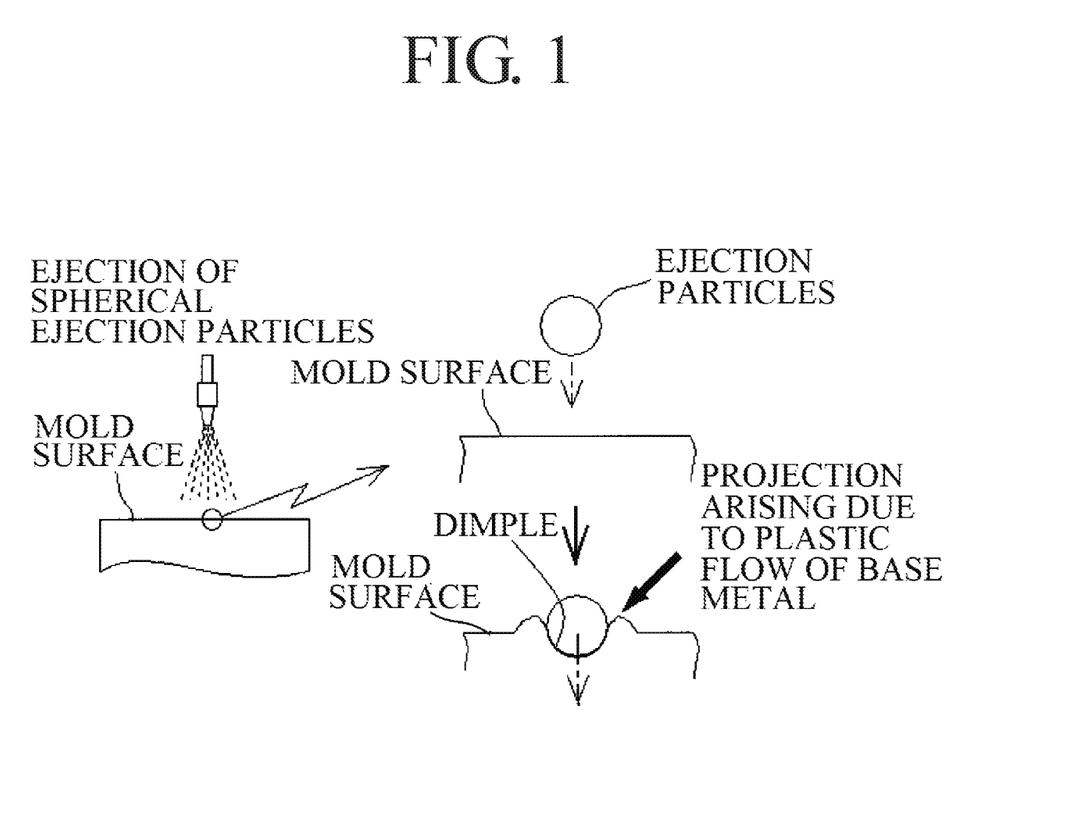
FIG. 1 is a diagram to explain projections arising on a mold surface accompanying the formation of dimples.

Moreover, as described in Patent Document 1 cited above, dimples are formed by ejecting ejection particles of 100 to 1000 μm that have a hardness harder than the base metal of the mold. However, not only are the dimples formed, but as illustrated in FIG. 1, the formation of projections is also confirmed on the surface of the mold bombarded with the ejection particles. These projections have a raised shape at peripheral edge portions of the dimples where the base metal of the mold is pressed out by plastic flow accompanying the formation of the dimples.

Projections formed in this manner are present in a state in which they bite into the surface of a molded workpiece during molding. Thus, one reason for why improved demoldability is not obtained is thought to be that the shape of such projections increases resistance when extracting a workpiece.

Moreover, the formation of such projections gives rise to a concern that fine scratch damage to the surface of a workpiece might be caused by sliding contact of such projections with the surface of the mold during demolding. This would lead to a deterioration in the appearance of products, such as due to a loss of glossiness on the workpiece surface, or a loss of transparency when a transparent molding material is employed.

In order to eliminate such issues, after dimples have been formed there is a need to remove such projections by performing a separate polishing operation or the like by ejecting ejection particles. The cost increase accompanying the increase in the number of operation steps leading to higher mold fabrication costs.

As a result of diligent investigations into the issues with conventional technology as described above, the inventors of the present invention have discovered that great improvements in demoldability are obtainable. This is achieved even in cases in which surface treatment is performed to form dimples on the mold surface by ejecting spherical ejection particles, similarly to in the invention described in Patent Document 1 that was cited above as an introduction to conventional technology. The diameter and depth of the dimples are adjusted to within a predetermined range so as to form dimples of a smaller diameter than those hitherto, and are preferably adjusted so as to form dimples that have both a smaller diameter and are shallower than those hitherto.

Moreover, the investigation results described above have indicated that the diameter and depth of the dimples that obtain such a great improvement in demoldability vary according to changes in the hardness of the base metal of the mold. This indicates that an unanticipated relationship exists. As a result, it has been confirmed that an improvement in demoldability is not obtainable merely by making the diameter and depth of the dimples smaller. The dimples should be formed with an appropriate diameter and depth based on a relationship to the hardness of the base metal of the mold.

Changes were made to the diameter and depth of the dimples to be formed in the above investigations. In this process, it was further discovered that dimples of the predetermined diameter and predetermined depth can be formed while suppressing the generation of projections that rise up due to plastic flow of the mold base metal, even in cases in which spherical ejection particles are ejected so as to form dimples by bombardment.

The present invention is based on the knowledge obtained from the results of the above investigations by the inventors of the present invention. The present invention is a method of treating a surface to form dimples on a surface of a mold by ejecting spherical ejection particles. The present invention provides a method of treating a surface of a mold which is capable of obtaining an improvement in demoldability even when applied to a mold formed from base metals of any material. This is achieved by clearly defining the range of diameter and depth of the dimples to be formed with respect to the hardness of the base metal of the mold.

Moreover, a separate object of the present invention is an object to provide a mold with improved demoldability without providing a separate process to remove projections. This is achieved by providing a method of treating a surface of a mold which enables dimples of a predetermined diameter and predetermined depth to be formed on a surface of the mold by ejecting ejection particles so as to bombard the surface, while suppressing the generation of projections with a raised shape arising due to plastic flow of mold base metal.

Means for Solving the Problems

In order to achieve the above objects, a method of treating a surface of a mold according to the present invention comprises:

forming dimples on a surface of a mold by ejecting substantially spherical ejection-particles so as to bombard the surface of the mold, the dimples being formed so as to satisfy a condition defined by the following formula:

$$1+3.3e^{-H/230} \leq W \leq 3+13.4e^{-H/1060} \quad \text{Formula (1)}$$

wherein W is an equivalent diameter (μm) of the dimples and H is a base metal hardness (Hv) of the mold.

The "equivalent diameter" here refers to the diameter of a circle determined by converting the projected surface area of a dimple formed on a molding surface to a circular projected surface area.

The dimples are preferably formed so as to also satisfy a condition defined by the following formula:

$$0.01+0.2e^{-H/230} \leq D \leq 0.01+1.1e^{-H/500} \quad \text{Formula (2)}$$

wherein D is a depth (μm) of the dimples and H is a base metal hardness (Hv).

Preferably, the dimples are formed by employing ejection particles having a median diameter of from 1 μm to 20 μm as the substantially spherical ejection particles and the ejection particles are ejected at an ejection pressure of from 0.01 MPa to 0.7 MPa such that a dimple-formed surface area is 50% or more of a surface area of the mold surface.

Note that the "median diameter" refers to a particle diameter that when employed to divide a group of particles into two, results in the integral volume of particles in the group of particles of larger diameter being the same volume as the integral volume of particles in the group of particles of smaller diameter.

Moreover, the ejection particles are preferably ejected against a surface of a mold having a surface roughness adjusted to an Ra of 0.3 μm or less.

The present invention also relates to a mold that has been surface treated with any of the above methods.

Effect of the Invention

The configuration of the present invention as described above enables the following significant advantageous effects to be obtained for a mold that has a surface treated by the surface treatment method of the present invention.

The equivalent diameters of dimples formed on the surface of a mold, and preferably the equivalent diameter and the depth of the dimples, are caused to lie within a predetermined range of sizes identified in relation to the base metal hardness of the mold according to the formulas cited above. This enables a great improvement in demoldability compared to cases in which dimples are formed on the mold surface by a conventional method, irrespective of the type of base metal of the mold.

The dimples formed on the surface of the mold by the method of the present invention exhibit demoldability by functioning to pool release agent or to trap air, similarly to dimples formed by the method introduced as conventional technology. Moreover, in addition to this, due to the diameters and depths of dimples identified in the present invention being smaller than the dimples formed by the conventional surface treatment method, the surface pressure acting at the dimples is larger, the ability to retain release agent is improved, enabling high demoldability to be obtained.

The dimple formation is performed by employing ejection particles having a median diameter of from 1 μm to 20 μm, and ejecting the ejection particles at an ejection pressure of from 0.01 MPa to 0.7 MPa. This enables the dimples having the equivalent diameters and depths described above to be formed relatively easily. When the dimples are formed under the above conditions, no large plastic flow of the mold base metal arises on bombardment with the ejection particles. This enables the formation of projections at peripheral edge portions of the dimples to be suppressed without a separate polishing process or the like, and enables the hardness of the surface of the mold after surface treatment to be raised compared to cases in which surface processing is performed by ejecting ejection particles having comparatively large diameters exceeding the particle diameters described above.

By suppressing projections of raised shape from being formed, a mold surface without the projections described above can be obtained at low cost without providing a separate operation to remove the projections after dimple formation. An increase in the resistance to extraction that accompanies the generation of projections is accordingly prevented, and a further improvement in demoldability can be obtained.

Moreover, due to being able to suppress the generation of the projections described above, a problem of which the projections scratch the surface of workpieces when extracting workpieces thereby cause damage etc. to the appearance of molded articles can be suitably prevented from occurring.

Furthermore, in addition to improving the demoldability due to the projections described above that cause stress concentration at the surface of the mold not being formed, and due to obtaining an improvement in surface hardness of the mold, a mold with improved durability and resistance to abrasion can also be provided. Moreover, due to improving the durability and resistance to abrasion in this manner, an ideal state for the dimples formed on the surface of the mold is maintained over a long period of time, enabling the mold to exhibit high demoldability for a long period of time.

Moreover, due to the surface treatment described above being performed on a surface of a mold adjusted to a surface roughness (arithmetic average roughness) Ra of 0.3 µm or less, a more preferable surface state can be imparted to the mold.

DESCRIPTION OF EMBODIMENTS

Next, explanation follows regarding exemplary embodiments of the present invention, with reference to the accompanying drawings.
Object to be Treated The surface treatment method of the present invention may be applied to molds in general that demand demoldability, and may be applied to any mold for which demoldability is demanded, without limitation to intended end-usage of the mold.

Such molds include molds for metal products, as well as molds for resin products and rubber products. Examples of molds for metal products include diecast molds, forging molds, press molds, and the like. Moreover, examples of molds for resin products and rubber products include molds for injection molding and the like.

The surfaces of portions within such molds that make contact with molding material may serve as a surface to be treated by the surface treatment method of the present invention, and both surfaces on a cavity (concave mold) side and on a core (convex mold) side serve as the object to be treated by the method of the present invention.

There are no particular limitations to the material of the mold, and various materials employed as materials for molds may be subjected to treatment. As well as ferrous metals, molds of non-ferrous metals such as aluminum alloys and the like may also be subjected to treatment.

Note that the surface roughness of the surface of a mold is preferably adjusted in advance to an arithmetic average roughness (Ra) of 0.3 µm or less prior to ejecting spherical ejection particles as described later.
Dimple Forming Dimples are formed on the surface of a mold as described above by ejecting substantially spherical ejection particles so as to bombard the surface of molding faces of the mold.

The following are examples of ejection particles, ejection apparatuses, and ejection conditions employed to form such dimples.
(1) Ejection Particles For the substantially spherical ejection particles employed in the method of the present invention, "substantially spherical" means that they do not need to be strictly "spherical", and ordinary "shot" may be employed therefor. Particles of any non-angular shape, such as an elliptical shape and a barrel shape, are included in "substantially spherical ejection particles" employed in the present invention.

Materials employable as the ejection particles include both metal-based and ceramic-based materials. Examples of materials for metal-based ejection particles include steel alloys, cast iron, high-speed tool steels (HSS) (SKH), tungsten (W), stainless steels (SUS), and the like. Examples of materials for ceramic-based ejection particles include alumina ($Al_2O_3$), zirconia ($ZrO_2$), zircon ($ZrSiO_4$), hard glass, glass, silicon carbide (SiC), and the like. The ejection particles employed are preferably ejection particles of a material having a hardness at least equivalent to that of the base metal of the mold to be treated.

Regarding the particle diameter of the ejection particles employed, particles having a median diameter ($D_{50}$) in a range of from 1 µm to 20 µm may be employed. For ferrous particles, particles having a median diameter ($D_{50}$) in a range of from 1 µm to 20 µm, and preferably from 5 µm to 20 µm, may be employed. For ceramic-based particles, particles having a median diameter ($D_{50}$) in a range of from 1 µm to 20 µm, and preferably from 4 µm to 16 µm, may be employed. From among ejection particles of these particle diameters, the particles employed are selected so as to be able to form the dimples of the diameter and depth described below in accordance with the material and the like of the mold to be treated.
(2) Ejection Apparatus A known blasting apparatus for ejecting compressed gas and abrasive may be employed as the ejection apparatus to eject the ejection particles described above against the surface of the mold.

Such blasting apparatuses are commercially available, such as a suction type blasting apparatus that ejects abrasive using a negative pressure generated by ejecting compressed gas, a gravity type blasting apparatus that causes abrasive falling from an abrasive tank to be carried and ejected by compressed gas, a direct pressure type blasting apparatus in which compressed gas is introduced into a tank filled with abrasive and the abrasive is ejected by merging the abrasive flow from the abrasive tank with a compressed gas flow from a separately provided compressed gas supply source, and a blower type blasting apparatus that carries and ejects the compressed gas flow from a direct pressure type blasting apparatus with a gas flow generated by a blower unit. Any one of the above may be employed to eject the ejection particles described above.

(3) Treatment Conditions

Ejection particles may be ejected using a blasting apparatus described above, for example, with an ejection pressure in the range of from 0.01 MPa to 0.7 MPa, and preferably from 0.05 MPa to 0.5 MPa, and performed such that the dimple-formed surface area (projected surface area) of the portion subjected to treatment is 50% or more of the surface area of the mold surface.

When the ejection particles are ejected, a combination of material and particle diameter for the ejection particles, and type, ejection pressure, and the like of the blasting apparatus employed, is selected in relation to the material, etc., of the mold to be treated so as to be able to form dimples of a dimple equivalent diameter (W) found according to Formula (1), given below.

$$1+3.3e^{-H/230} \leq W \leq 3+13.4e^{-H/1060}$$ Formula (1)

In Formula (1) above, W is the dimple equivalent diameter (μm), and H is the base metal hardness (Hv).

When the ejection particles are ejected, in addition a combination of conditions is preferably employed that also enable dimples to be formed at a dimple depth (D) found according to Formula (2), given below.

$$0.01+0.2e^{-H/230} \leq D \leq 0.01+1.1e^{-H/500}$$ Formula (2)

In Formula (2), D is the dimple depth (μm), and H is the base metal hardness (Hv).

(4) Operation Etc.

A mold subjected to surface treatment using the surface treatment method of the present invention as described above is confirmed to have greatly improved demoldability. The examples thereof described below achieve, for example, highly improved demoldability at least 5 times greater than that of a mold (polished object) finished smooth by hand, or at least 3.5 times greater than that of a mold formed with dimples having diameters and depths that exceed those defined by the present invention. These examples also have improved durability that is 6.5 times that of a polished object, or up to 2.5 times greater than that of a mold formed with dimples having diameters and depths that exceed those defined by the present invention.

Such a great improvement in demoldability is not thought to result only from release agent being retained in the dimples arising from forming dimples by the method of the present invention and an improvement in demoldability due to the reduction of contact surface area between molding material and the mold surface due to retaining air therebetween, these being effects similar to those achieved by dimples formed on a mold surface by a conventional surface treatment method. However, in addition thereto, as a result of the method of the present invention, a further improvement in demoldability is thought to be achieved due to the following operation not achievable when dimples are formed using a conventional method.

In the present invention, in which dimples are formed with a diameter defined by Formula (1) above, and are preferably formed with a diameter defined by Formula (1) above and a depth defined by Formula (2) above, the dimples formed have a smaller diameter and depth than those of dimples formed in a mold surface by a method of conventional technology.

It is accordingly thought that counterforce increases as a result of the surface pressure acting at the dimples being larger than that hitherto, and the ability to retain release agent and air in the dimples is improved, thereby improving demoldability.

Moreover, in cases in which such smaller dimples are formed, there is a decreased amount of the mold base metal being pressed out by plastic flow accompanying bombardment with the ejection particles. As a result, projections that have a raised shape at peripheral edge portions of the dimples and that increase the resistance to extraction during demolding are not liable to be formed. It is thought that this contributes to the improvement in demoldability.

Furthermore, with respect to the surface treatment to the core (convex mold), in conventional surface treatment in which comparatively large dimples are formed, convex portions transferred by the dimples and generated on the surface of a workpiece bite into the dimples due to shrinkage of the molding material caused by cooling, accordingly increasing the resistance to extraction.

However, in cases in which a mold is employed that was formed with the comparatively small dimples using the method of the present invention, both the dimples and the convex portions on the workpiece surface formed by transfer of the dimples are small. Thus, not only is the catching resistance inherently smaller, but it is also thought that, due to the dimples being small, a slight positional misalignment arises between the convex portions on the workpiece surface and the dimples arises due to the molding material shrinking in a length direction. This results in a state in which the convex portions have moved out from inside the dimples and is thought to be a contributing factor to the improved demoldability.

Moreover, ejection particles that have a comparatively small particle diameter, i.e. a median diameter from 1 μm to 20 μm, are employed as the spherical ejection particles to form the comparatively small dimples as described above. The surface-hardness after treatment is therefor raised compared to a conventional surface treatment method employing ejection particles having a larger particle diameter, and this is also thought to be a contributing factor to the greatly improved demoldability obtained.

It is known that when shot peening is performed by ejecting shot so as to bombard the surface of a metal product to be treated, hardness rises and the surface structure of the workpiece is miniaturized. The rise in the surface hardness of a mold according to this principle is thought to be something that is not only obtained by the surface treatment method of the present invention, but is also similarly obtained by a conventional method of treating a surface of a mold in which treatment is performed by ejecting spherical ejection particles at a mold surface.

Figure 2:
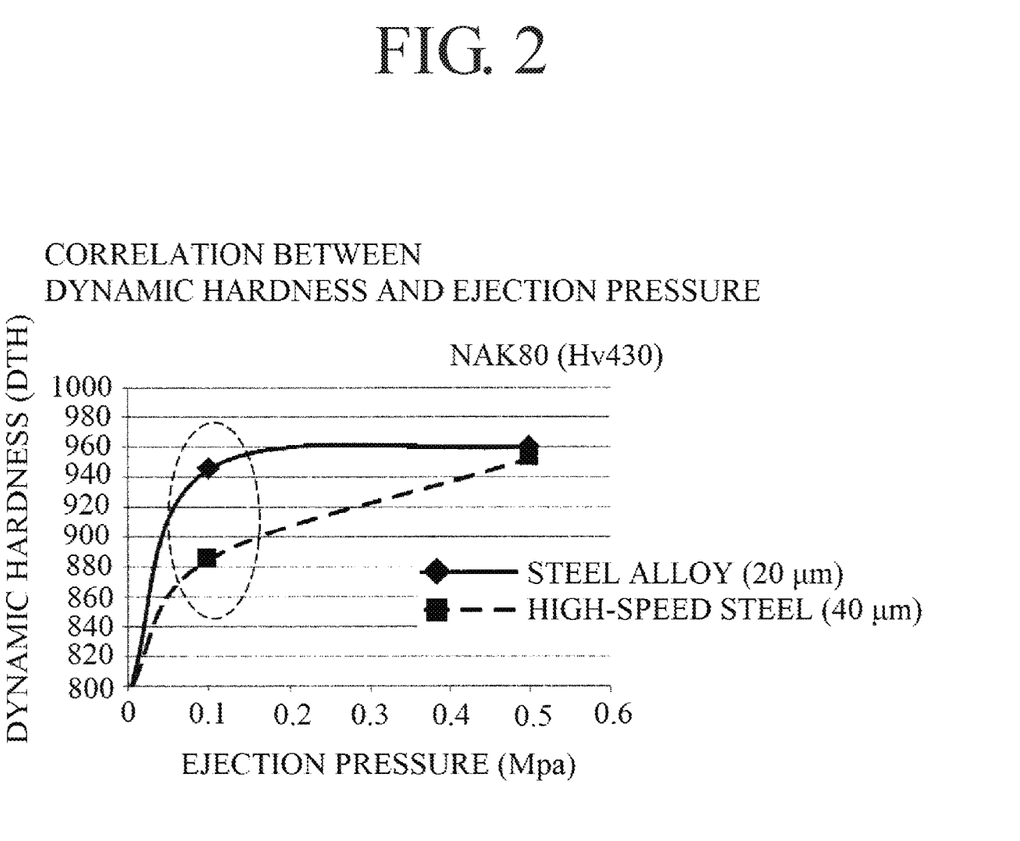
FIG. 2 is a diagram correlating ejection pressure and dynamic hardness.

However, tests performed to measure the surface hardness of treated objects after performing treatment in which ejection particles of different particle diameters are ejected against the surface of a mold confirm that, within a comparatively low ejection pressure range, a higher rise in hardness is obtained when ejection particles with a smaller particle diameters are employed.

FIG. 2 is a diagram illustrating the results of performing the above tests on a mold manufactured from NAK 80 (Hv 430). In a range of ejection pressures up to 0.5 MPa, the dynamic hardness of the mold surface was found to be raised more when ejection particles (material: steel alloy) with a median diameter of 20 μm were ejected (see the solid line in FIG. 2) than when ejection particles (material: high-speed steel) with a median diameter of 40 μm were ejected (see the dashed line in FIG. 2).

Different effects arise in this manner from the differences of particle diameters of the ejection particles employed. When ejection particles having a small particle diameter are used, the flight speed of the ejection particles is raised, raising the bombardment energy when the mold surface is bombarded, which raises the bombardment energy per unit surface area at the bombarded positions. This is thought to result in a higher forging effect being obtained even when ejecting with a low pressure compressed gas. Obtaining such a rise in hardness is also thought to contribute to improved demoldability and durability.

Note that reference to "dynamic hardness" means a hardness obtained from an indentation depth at a test force in a process to indent a triangular pyramidal indenter, and the dynamic hardness can be found for a test force P (mN) and an indentation depth D of an indentor (μm) by the following formula.

$$DH = \alpha \times P \div (D^2)$$

Herein, α is an indenter shape coefficient. In the measurements described above, a Shimadzu Dynamic Ultra Micro Hardness Tester DUH-W201 (manufactured by Shimadzu Corporation) was employed, and α was measured at 3.8584 when a 115° triangular pyramidal indenter was employed.

EXAMPLES

A description follows regarding tests performed to derive the treatment conditions defined in the present invention, and regarding tests to confirm the advantageous effects.

Test to Identify Diameter (Equivalent Diameter) and Depth of Dimples to Improve Demoldability (1) Test Objective To find conditions (diameter and depth) for forming dimples enabling greatly improved demoldability of molds.

(2) Test Method (2-1) Summary

Dimples were formed on plural types of molds made from base materials which are respectively different, while employing varying combinations of material and particle diameter of the ejection particles employed and the ejection method (ejection apparatus, ejection pressure, etc.). The diameter and depth of the dimples formed was then measured.

After forming the dimples, molding was performed using each of the molds, demoldability was then evaluated and compared with the demoldability of molds whose surfaces had been finished smooth by hand (referred to below as "polished object").

Figure 3:
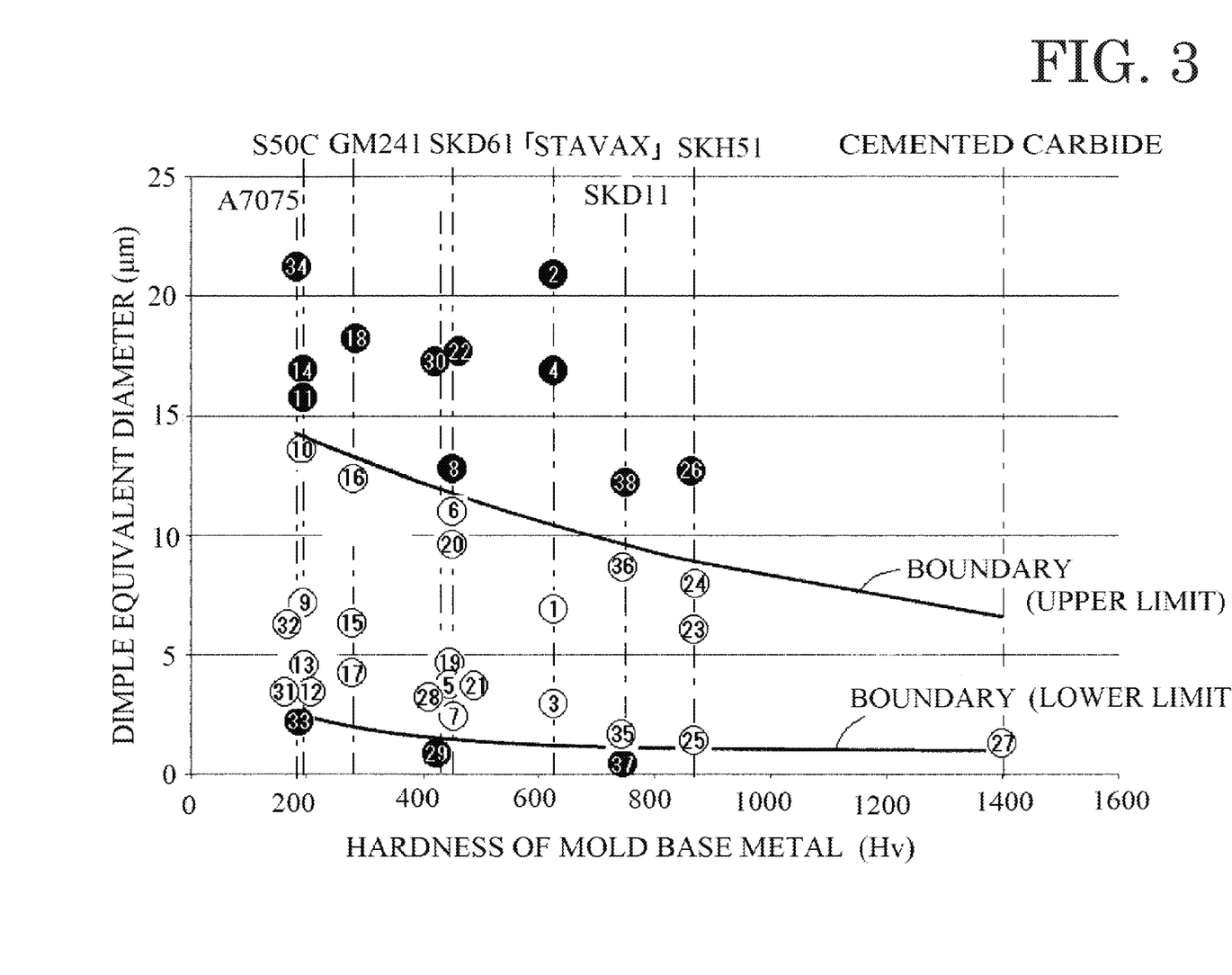
FIG. 3 is a scatter plot of dimple equivalent diameter against hardness of mold base metal for Samples 1 to 38.
Figure 4:
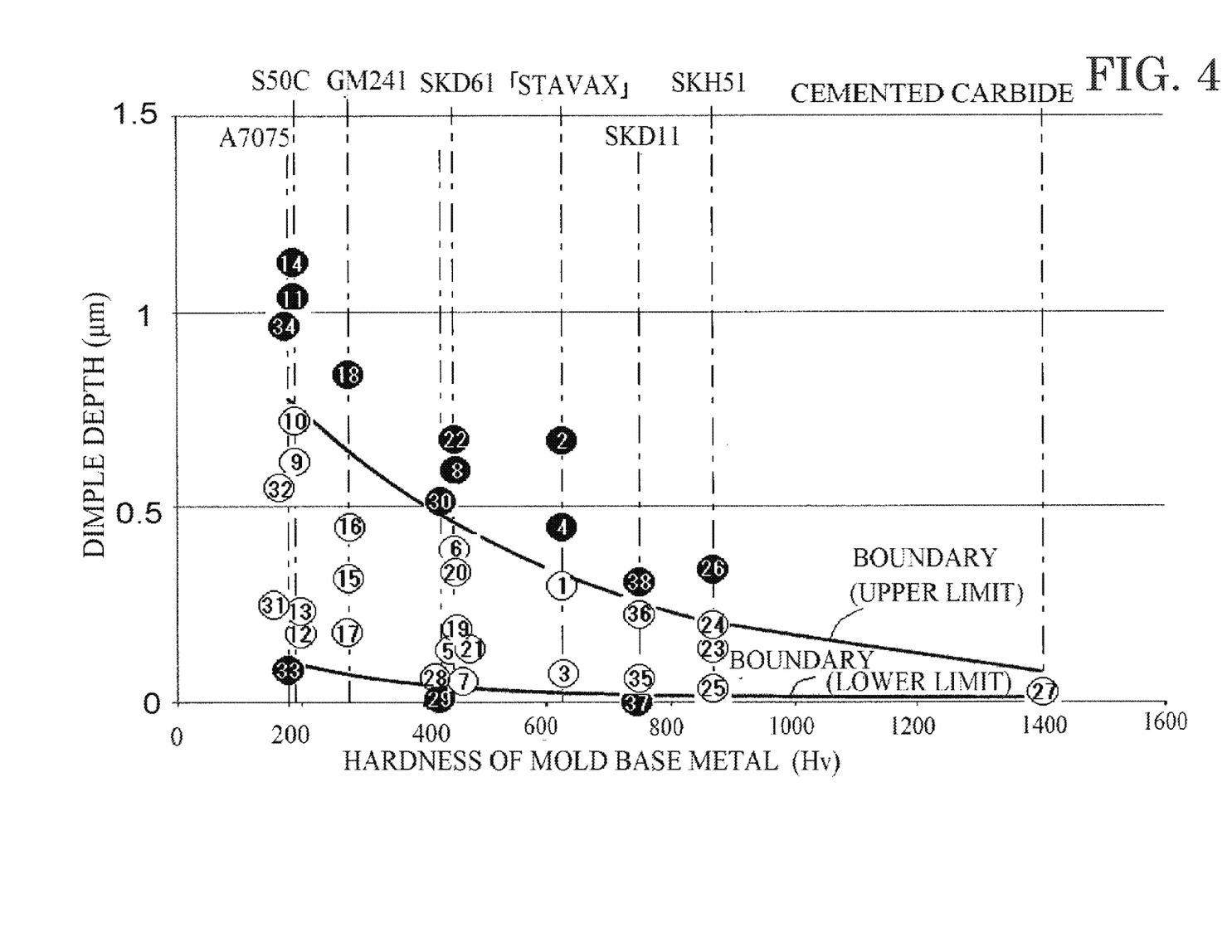
FIG. 4 is a scatter plot of dimple depth against hardness of mold base metal for Samples 1 to 38.

In order to be able to distinguish between results of the comparison showing similar or inferior demoldability to that of the polished object, and those showing a great improvement in demoldability to the polished object, the comparison results were plotted as scatter plots on a graph with dimple diameter on the vertical axis and the base metal hardness of the mold on the horizontal axis (FIG. 3), and on a graph with dimple depth on the vertical axis and hardness of mold base metal on the horizontal axis (FIG. 4). Fitted curves were drawn in the generated scatter plots at the upper and lower limits of a group of Samples for which an improvement in demoldability was seen, and the formulas of these fitted curves derived to give a relational expression to identify ranges of diameter and depth of dimples achieving improved demoldability.

(2-2) Types of Mold and Treatment Conditions

The materials of molds to be treated and the treatment conditions for the surface treatment performed on each of the molds are listed in Table 1 and Table 2, below.

TABLE 1

Type of Mold and Mold Treatment Conditions 1

| | Spherical Ejection Particles | | | Ejection Conditions | | | | Mold | |
|---|---|---|---|---|---|---|---|---|---|
| | Particle | | | | Ejection | Nozzle | Ejection | | |
| Sample No. | Diameter D$^{50}$ (μm) | Material | Hardness (Hv) | Ejection Method | Pressure (MPa) | Diameter (mm) | Duration (sec) | Base Metal (Type) | Hardness (Hv) |
| 1 | 21 | steel alloy | 870 | FD | 0.5 | 5 | 1800 | "STAVAX" (cavity) | 630 |
| 2 | 80 | high-speed steel | 840 | FD | 0.5 | 5 | 1800 | | |
| 3 | 13 | steel alloy | 870 | FD | 0.2 | 5 | 360 | | |
| 4 | 36 | high-speed steel | 840 | FD | 0.2 | 5 | 360 | | |
| 5 | 15 | alumina | 1800 | SF | 0.3 | 7 | 30 | SKD61 (core pin) | 450 |
| 6 | 20 | zirconia | 1300 | FD | 0.3 | 5 | 30 | | |
| 7 | 7 | zirconia | 1300 | LD | 0.05 | 9 | 30 | | |
| 8 | 63 | alumina | 1800 | SF | 0.3 | 7 | 30 | | |
| 9 | 17 | steel alloy | 870 | SF | 0.5 | 7 | 30 | S50C (core pin) | 194 |
| 10 | 20 | alumina | 1800 | FD | 0.3 | 5 | 30 | | |
| 11 | 64 | high-speed steel | 840 | SF | 0.5 | 7 | 30 | | |
| 12 | 15 | steel alloy | 870 | SF | 0.1 | 7 | 30 | | |
| 13 | 20 | zircon | 700 | LD | 0.01 | 9 | 30 | | |
| 14 | 80 | high-speed steel | 840 | SF | 0.1 | 7 | 30 | | |
| 15 | 20 | zircon | 700 | SF | 0.3 | 7 | 30 | GM241 (die) | 280 |
| 16 | 20 | zirconia | 1300 | FD | 0.1 | 5 | 30 | | |
| 17 | 16 | alumina | 1800 | LD | 0.05 | 9 | 30 | | |

TABLE 1-continued

Type of Mold and Mold Treatment Conditions 1

| | Spherical Ejection Particles | | | Ejection Conditions | | | Mold | |
|---|---|---|---|---|---|---|---|---|
| | Particle | | | Ejection | Nozzle | Ejection | | |
| Sample No. | Diameter $D^{50}$ (μm) | Material | Hardness (Hv) | Ejection Method | Pressure (MPa) | Diameter (mm) | Duration (sec) | Base Metal (Type) | Hardness (Hv) |
| 18 | 63 | zircon | 700 | SF | 0.3 | 7 | 30 | | |
| 19 | 15 | zircon | 700 | SF | 0.5 | 7 | 30 | SKD61 | 450 |
| 20 | 20 | zirconia | 1300 | FD | 0.2 | 5 | 30 | (punch) | |
| 21 | 16 | alumina | 1800 | LD | 0.05 | 9 | 30 | | |
| 22 | 63 | zircon | 700 | SF | 0.5 | 7 | 30 | | |

TABLE 2

Type of Mold and Mold Treatment Conditions 2

| | Spherical Ejection Particles | | | Ejection Conditions | | | Mold | |
|---|---|---|---|---|---|---|---|---|
| | Particle | | | Ejection | Nozzle | Ejection | | |
| Sample No. | Diameter $D^{50}$ (μm) | Material | Hardness (Hv) | Ejection Method | Pressure (MPa) | Diameter (mm) | Duration (sec) | Base Metal (Type) | Hardness (Hv) |
| 23 | 20 | zirconia | 1300 | SF | 0.5 | 7 | 30 | SKH51 | 870 |
| 24 | 20 | alumina | 1800 | FD | 0.6 | 5 | 30 | (punch) | |
| 25 | 4 | alumina | 1800 | FD | 0.3 | 5 | 30 | | |
| 26 | 48 | high-speed steel | 840 | SF | 0.3 | 7 | 30 | | |
| 27 | 20 | alumina | 1800 | FD | 0.5 | 5 | 30 | Cemented carbide (punch) | 1400 |
| 28 | 15 | steel alloy | 870 | SF | 0.1 | 7 | 30 | NAK80 | 430 |
| 29 | 8 | alumina | 1800 | LD | 0.05 | 9 | 30 | (cavity) | |
| 30 | 80 | high-speed steel | 840 | SF | 0.1 | 7 | 30 | | |
| 31 | 8 | steel alloy | 870 | SF | 0.1 | 7 | 30 | A7075 | 183 |
| 32 | 15 | alumina | 1800 | SF | 0.3 | 7 | 30 | (cavity) | |
| 33 | 10 | alumina | 1800 | LD | 0.05 | 9 | 30 | | |
| 34 | 80 | high-speed steel | 840 | SF | 0.5 | 7 | 30 | | |
| 35 | 4 | high-speed steel | 840 | SF | 0.5 | 7 | 30 | SKD11 (plastic mold) | 750 |
| 36 | 20 | alumina | 1800 | FD | 0.5 | 5 | 30 | | |
| 37 | 4 | alumina | 1800 | LD | 0.05 | 9 | 30 | | |
| 38 | 48 | high-speed steel | 840 | SF | 0.1 | 7 | 30 | | |

*The ejection methods indicated in Table 1 and Table 2 employed the following blasting apparatuses:
SF: Suction Type ("SFK-2" manufactured by Fuji Manufacturing Co., Ltd.)
FD: Direct Pressure Type ("FDQ-2" manufactured by Fuji Manufacturing Co., Ltd.)
LD: Blower Type ("LDQ-2" manufactured by Fuji Manufacturing Co., Ltd.)

For comparison, polished objects of the respective molds were prepared. Note that the surface roughness Ra after polishing was 0.1 μm or less for the "STAVAX" (cavity) and SKD61 (core pin), 0.2 μm or less for the S50C (core pin), GM241 (die), SKD61 (punch), SKH51 (punch), A7075 (cavity), and SKD11 (for plastic molding), and 0.15 μm or less for the NAK80 (cavity).

(2-3) Dimple Diameter (Equivalent Diameter) and Depth Measurement Method

The diameter (equivalent diameter) and depth of the dimples were measured using a profile analyzing laser microscope ("VK-X250" manufactured by Keyence Corporation).

Measurements of the surface of the mold were made directly in cases in which direct measurement was possible. In cases in which direct measurement was not possible, methyl acetate was dripped onto a cellulose acetate film to cause the cellulose acetate film to follow the surface of the mold, and after drying and peeling off the cellulose acetate film, measurement was performed based on the inverted dimples transferred to the cellulose acetate film. Surface image data imaged by the profile analyzing laser microscope (or, image data inverted from captured images measured by employing the cellulose acetate film) was analyzed using a "Multi-File Analysis Application (VK-H1XM by Keyence Corporation) to perform the measurements.

The "Multi-File Analysis Application" is an application that uses data measured by a laser microscope to measure surface roughness, line roughness, height and width, etc. The application analyzes the equivalent circular diameter, depth, and the like, sets a reference plane, and is capable of performing image processing such as height inversion.

In measuring, first the "image processing" function is used to set the reference plane (however, in cases in which the surface shape is a curved plane, the reference plane is set after the curved plane has been corrected to a flat plane by using plane shape correction). Then, the measurement mode is set to indentation in the "volume/area measurement" function of the application, indentations are measured with respect to the set "reference plane", and the "average depth" in the indentation measurement results and the average value of the results for "equivalent circular diameter" are set as the depth and equivalent diameter of the dimples.

Note that the reference plane described above was computed from height data using a least squares method.

Moreover, the "equivalent circular diameter" and the "equivalent diameter" described above are measured as the diameter of a circle determined by converting the projected surface area measured for an indentation (dimple) into a circular projected surface area.

Note that the "reference plane" described above indicates a flat plane at the origin (reference) measurement for height data, and is employed mainly to measure depth, height, etc. in the vertical direction.

(3) Measurement Results

The measurement results for each of the Samples with regards to dimple equivalent diameter and dimple depth and the evaluation results for demoldability are listed in Table 3 and Table 4. FIG. 3 is a scatter plot illustrating dimple equivalent diameter against hardness of mold base metal for all Samples, and FIG. 4 is a scatter plot illustrating dimple depth against hardness of mold base metal for all Samples.

TABLE 3

Measurement Results for Dimple equivalent diameter and Depth, and Demoldability Evaluation Results 1

| Mold | Sample No. | Dimple Equivalent Diameter (μm) | Dimple Depth (μm) | Demoldability Evaluation |
|---|---|---|---|---|
| "STAVAX" | 1 | 6.94 | 0.30 | ○ |
| (PC resin | 2 | 20.72 | 0.66 | X |
| molding cavity) | 3 | 2.92 | 0.08 | ○ |
|  | 4 | 16.85 | 0.43 | X |
| SKD61 | 5 | 3.90 | 0.14 | ○ |
| (POM resin | 6 | 11.18 | 0.38 | ○ |
| molding core pin) | 7 | 2.44 | 0.04 | ○ |
|  | 8 | 12.64 | 0.59 | X |
| S50C | 9 | 6.94 | 0.61 | ○ |
| (PVC(polyvinylchloride) | 10 | 13.72 | 0.74 | ○ |
| rubber | 11 | 15.76 | 1.12 | X |
| molding core pin) | 12 | 3.98 | 0.20 | ○ |
|  | 13 | 4.44 | 0.18 | ○ |
|  | 14 | 16.88 | 1.03 | X |
| GM241 | 15 | 6.27 | 0.32 | ○ |
| (Die) | 16 | 12.29 | 0.45 | ○ |
|  | 17 | 4.28 | 0.18 | ○ |
|  | 18 | 18.31 | 0.84 | X |
| SKD61 | 19 | 4.52 | 0.20 | ○ |
| (punch) | 20 | 9.57 | 0.34 | ○ |
|  | 21 | 3.85 | 0.13 | ○ |
|  | 22 | 17.37 | 0.67 | X |

* Evaluations of demoldability indicate:
○: improved demoldability compared to a polished object
X: demoldability the same as or worse than that of a polished object

TABLE 4

Measurement Results for Dimple equivalent diameter and Depth, and Demoldability Evaluation Results 2

| Mold | Sample No. | Dimple Equivalent Diameter (μm) | Dimple Depth (μm) | Demoldability Evaluation |
|---|---|---|---|---|
| SK51 | 23 | 6.04 | 0.14 | ○ |
| (punch) | 24 | 7.87 | 0.19 | ○ |
|  | 25 | 1.08 | 0.03 | ○ |
|  | 26 | 12.83 | 0.34 | X |
| Cemented carbide | 27 | 1.26 | 0.02 | ○ |
| (punch) |  |  |  |  |
| NAK80 | 28 | 2.65 | 0.06 | ○ |
| (PP resin | 29 | 1.09 | 0.02 | X |
| molding cavity) | 30 | 17.26 | 0.50 | X |
| A7075 | 31 | 3.13 | 0.23 | ○ |
| (PS resin | 32 | 6.36 | 0.54 | ○ |
| molding cavity) | 33 | 2.33 | 0.09 | X |
|  | 34 | 21.25 | 0.97 | X |
| SKD11 | 35 | 1.56 | 0.07 | ○ |
| (PC resin | 36 | 8.96 | 0.23 | ○ |
| molding cavity) | 37 | 0.72 | 0.01 | X |
|  | 38 | 12.30 | 0.30 | X |

* Evaluations of demoldability indicate:
○: improved demoldability compared to a polished object
X: demoldability the same as or worse than that of a polished object (4) Interpretation In the scatter plots illustrated in FIG. 3 and FIG. 4, the numbers in the circles indicate the respective sample numbers, with the numbers displayed on a white background indicating the sample numbers of Samples for which a great improvement in demoldability was confirmed relative to a polished object, and the numbers displayed in white on a black background indicating the sample numbers of Samples for which demoldability was equivalent or inferior to that of a polished object.

As is apparent from the scatter plots illustrated in FIG. 3 and FIG. 4, for both the equivalent diameter and depth of the dimples, it was found that the Samples that obtained an improvement in demoldability were concentrated at the lower side of the scatter plots, and the Samples that displayed demoldability equivalent or inferior to that of the polished object were concentrated at the upper side of the scatter plots. Thus, it was confirmed that making both the equivalent diameter and the depth of the formed dimples smaller improved the demoldability.

It is hypothesized from these results that forming comparatively large dimples increases the resistance to demolding due to engagement between irregularities in the workpiece surface and irregularities in the mold surface, and that a great improvement in demoldability is not obtainable due to comparatively large projections arising at the peripheral edge portions of dimples from plastic flow at the dimples.

However, there is a lower limit to the equivalent diameter and depth of the dimples formed, and if these are too small then an improvement in demoldability is no longer seen. Such a phenomenon is thought to occur because, as the dimples formed get smaller, the surface state of the mold after dimple formation approaches that of the polished surface of the state prior to dimple formation, and so the properties of a polished surface predominate.

Moreover, as illustrated in FIG. 3 and FIG. 4, for a sample (Sample 10) where surface treatment was performed on a core pin manufactured from S50C, which has a base metal hardness of about 194 Hv, an improvement in demoldability was obtained when the dimple equivalent diameter was 13.72 μm and the dimple depth was 0.74 μm. However, for a sample (Sample 38) where surface treatment was performed on a mold made from "SKD11", which has a base metal hardness of 750 Hv, it was confirmed that there was no improvement in demoldability obtained when the dimple equivalent diameter was 12.30 μm and the dimple depth was 0.30 μm, despite the dimples being formed with smaller diameters and depths to those of Sample 10, for which an improvement in demoldability was confirmed.

A logical hypothesis from these results is that when the base metal hardness of the mold to be treated changes, the equivalent diameter and depth of the dimples required to obtain an improvement in demoldability changes, and as the base metal hardness of the mold rises, an improvement in demoldability is not obtainable unless the equivalent diameter and depth of the dimples is made smaller.

The curves labeled "boundary (upper limit)" in the scatter plots of FIG. 3 and FIG. 4 are fitted curves applied to the boundary on the upper side of the group of Samples for which an improvement in demoldability was confirmed. These curves represent approximations to the manner in which the upper limit values of equivalent diameter and depth of dimples that obtain an improvement in demoldability change relative to changes in base metal hardness of the mold.

Moreover, the curves labeled "boundary (lower limit)" in the scatter plots of FIG. 3 and FIG. 4 are fitted curves applied to a boundary on the lower side of the group of Samples for which an improvement in demoldability was confirmed. These curves represent approximations to the manner in which the lower limit values of equivalent diameter and depth of dimples that obtain an improvement in demoldability change relative to changes in base metal hardness of the mold.

Thus, from a formula representing the fitted curve at the upper values ($W \leq 3+13.4e^{-H/1060}$) and a formula representing the fitted curve at the lower values ($W \geq 1+3.3e^{-H/230}$) illustrated in FIG. 3 which is a scatter plot of the dimple equivalent diameter (W) against hardness of mold base metal (H), a range of dimple equivalent diameters (W) for which an improvement in demoldability is obtainable can be identified by the following formula.

$$1+3.3e^{-H/230} \leq W \leq 3+13.4e^{-H/1060} \quad \text{Formula (1)}$$

Any dimples formed with an equivalent diameter lying within this range obtain a great improvement in demoldability.

Moreover, from a formula representing the fitted curve at the upper values ($D \leq 0.01+1.1e^{-H/500}$) and a formula representing the fitted curve at the lower values ($D \geq 0.01+0.2e^{-H/230}$) illustrated in FIG. 4 which is a scatter plot of the dimple depth (D) against hardness of mold base metal (H), a range of dimple depth (D) for which an improvement in demoldability is obtainable can be identified by the following formula.

$$0.01+0.2e^{-H/230} \leq D \leq 0.01+1.1e^{-H/500} \quad \text{Formula (2)}$$

Any dimples formed with a depth lying within this range obtain a great improvement in demoldability.

Demolding Resistance Force Measurement Tests
(1) Test Objective

The test is performed in order to ascertain numerically the degree by which the demoldability is improved by the surface treatment method of the present invention.

(2) Test Method

Demolding resistance forces when molding polyacetal (POM: polyoxymethylene) resin were measured and compared by employing molds for plastic molding in which core pins of Samples 5 to 8 and a core pin of a polished object are respectively used. Note that the core pins of Samples 5 to 8 were manufactured from SKD61 and surface treated by ejecting substantially spherical ejection particles, and the core pin of the polished object was manufactured from SKD61 and polished to a surface roughness Ra of less than 0.1 μm.

The core pins were circular column shaped with a diameter of 30 mm and a length of 70 mm (draft angle 0 (zero)). Circular tube shaped polyacetal resin molded articles with an internal diameter of 30 mm, an external diameter of 34 mm, and a length of 28 mm were molded by combining these core pins (convex mold) with cavities (concave mold).

Note that the demolding resistance force in the present test is a value of the force (N) needed for push out with a stripper plate provided to a mold, as measured using a liquid crystal piezoelectric sensor. In the comparison, the demolding resistance forces for Sample numbers 5 to 8 were taken as percentages relative to the demolding resistance force of the polished object, this being expressed as 100%.

(3) Test Results

Comparison results for demolding resistance forces are listed in Table 5.

TABLE 5

Results of Demolding Resistance Force Comparison

| | Sample Name | Demolding Resistance Force Ratio (%) |
|---|---|---|
| Reference | Polished object | 100 |
| Examples | Sample 5 | 20 |
| | Sample 6 | 30 |
| | Sample 7 | 20 |
| Comparative Example | Sample 8 | 80 |

(4) Interpretation of Test Results

The core pins (Examples) of Samples 5 to 7 formed with dimples having equivalent diameters and depths lying within the ranges of Formula (1) and Formula (2) cited above were confirmed to exhibit the excellent advantageous effect of reducing the demolding resistance to 20% to 30% of the demolding resistance of the polished object, i.e., 100%.

However, the core pin (Comparative Example) of Sample 8 formed with dimples having an equivalent diameter and depth exceeding the ranges of Formulas (1) and (2) cited above only reduced the demolding resistance by 20% and had a limited effect compared to the Examples.

The great improvement in demoldability from the surface treatment method of the present invention is thereby also apparent from the numerical values.

Mold Durability Test 1
(1) Test Objective

The test is performed in order to confirm the durability of a mold treated with the surface treatment method of the present invention.

(2) Test Method

Dies manufactured from GM241 and punches manufactured from SKD61 were surface treated by ejecting substantially spherical ejection particles to give Samples 15 to 18 and Samples 19 to 22, respectively, and these dies and punches were employed in combination as press molds. A die manufactured from GM241 and a punch manufactured from SKD61 were finished to a surface roughness Ra of 0.2 μm or less and employed in combination as a press mold. Successive press molding was performed with these press molds, and a count was taken of the number of molded articles that had been manufactured at the time when adhesion to the die of the press mold occurred, and there was damage to the surface of the molded article (workpiece). The durability of each of the molds was evaluated from the number of manufactured molded articles.

The evaluation was an evaluation as percentages relative to a number manufactured with the polished object press mold which is expressed as 100%.

(3) Test Results

The test results for mold durability are listed in Table 6 below.

TABLE 6

Results of Durability Test 1

| | Press Mold | | |
|---|---|---|---|
| | Die | Punch | Durability (%) |
| Reference Examples | Polished object | Polished object | 100 |
| | Sample 15 | Sample 19 | 620 |
| | Sample 16 | Sample 20 | 650 |
| | Sample 17 | Sample 21 | 530 |
| Comparative Example | Sample 18 | Sample 22 | 260 |

(4) Interpretation of Test Results

The above results confirmed that durability improved by employing press molds (Examples) formed by respective combinations of a die of Samples 15 to 17 and a punch of Samples 19 to 21, which were formed with dimples having equivalent diameters and depths lying within the ranges of Formula (1) and Formula (2) cited above. The durability improvement confirmed was at least 5.3 times, and a maximum of 6.5 times in comparison with a case when a polished object press mold was employed.

In contrast thereto, when a press mold (Comparative Example) formed by combining a die of Sample 18 and a punch of Sample 22 formed with dimples having equivalent diameters and depths lying outside the ranges of Formulas (1) and (2) cited above was employed, although durability improved to 2.6 times in comparison with a case when a polished object press mold was employed, durability did not increased as highly as in the Examples.

The above results have confirmed that the surface treatment method of the present invention enables to perform processing by which demoldability performance can be maintained over longer periods of time.

Such high durability is thought to be because, not only is the surface area in contact with the molding material reduced by forming the dimples, but there is also little base metal pushed out by plastic flow on bombardment with the spherical ejection particles due to forming comparatively small dimples within a range of diameters and depths defined in advance. This suppresses projections raised at the peripheral edge portions of the dimples from being formed, and improves the durability of the die and punch due to improving the slipperiness thereof.

The press mold of the Comparative Example is formed with larger dimples which have an equivalent diameter and depth lying outside the ranges expressed by Formula (1) and Formula (2) cited above. In this case there is accordingly a larger amount of base metal of the mold pushed out by plastic flow on bombardment with the spherical ejection particles, and this pushed out base metal forms projections raised at the peripheral edge portions of the dimples. It is thought that the durability deteriorates due to the presence of these projections.

In fact, results of observations of edge portions of the press mold of the Comparative Example confirmed that there was a large change to the shape of edge portions of the mold of the Comparative Example after being used in pressing. The comparatively large dimples formed at edge portions on bombardment with the spherical ejection particles create a state similar to a state in which "defects" have been generated on the edge portions. It is thought that spreading deformation of the edge portions from these portions is a cause of the difference in durability.

Mold Durability Test 2

(1) Test Objective

The test is performed in order to confirm that an improvement in durability is obtained even in cases in which the surface treatment method of the present invention is employed to treat molds (punches manufactured from SKH51 (Hv 870)) having a higher hardness than the molds (dies manufactured from GM241 (Hv 280) and punches manufactured from SKD61 (Hv 450)) treated in the "Mold Durability Test 1" cited above.

(2) Test Method

Press molds (punches) manufactured from SKH51 were surface treated by ejecting substantially spherical ejection particles to give Samples 23 to 26, and a press mold (punch) (polished object) manufactured from SKH51 was finished to a surface roughness Ra of 0.2 µm or less. Successive press molding was performed employing these press molds. The occurrence of galling on workpieces was observed, and the durability of each of the molds was evaluated by the number of shots at which galling occurred.

Evaluation was an evaluation as percentages relative to the number of shots for a polished object press mold, this being expressed as 100%.

(3) Test Result

Test results for mold durability are illustrated in Table 7 below.

TABLE 7

Results of Durability Test 2

| | Press Mold (Punch) | Durability (%) |
|---|---|---|
| Reference Examples | Polished object | 100 |
| | Sample 23 | 280 |
| | Sample 24 | 320 |
| | Sample 25 | 270 |
| Comparative Examples | Sample 26 | 180 |

(4) Interpretation of Test Results

The above results confirmed that durability improved by employing press molds (punches) of the Samples 23 to 25 (Examples), which were formed with dimples having equivalent diameters and depths lying within the ranges of Formula (1) and Formula (2) cited above. The durability improvement confirmed was at least 2.7 times, and a maximum of 3.2 times in comparing with a case when a polished object press mold was employed.

This contrast with a case in which a press mold of Sample 26 (Comparative Example), which was formed with dimples having equivalent diameters and depths lying outside the ranges of Formulas (1) and (2) cited above, was employed. In this case, although durability improved to 1.8 times in comparing with a case when a polished object press mold was employed, durability did not increased as highly as in the Examples.

Thereby, molds subjected to the surface treatment of the present invention were confirmed to be less liable to galling, and to have greatly improved demoldability. Such an advantageous effect of improving the demoldability and the durability was confirmed to be similarly obtained when the surface treatment of the present invention was applied to any mold of different base metals.

Mold Durability Test 3

(1) Test Objective

The test is performed in order to confirm the effectiveness of treating a punch manufactured from a cemented carbide (Hv 1400) with the surface treatment method of the present invention.

(2) Test Method

Successive press molding was performed while employing a press mold (punch) manufactured from cemented carbide that was surface treated by ejecting substantially spherical ejection particles, and a press mold (punch) (polished object) manufactured from cemented carbide and finished to a surface roughness Ra of 0.2 μm or less. The occurrence of streaking on workpieces was observed, and durability of the mold was evaluated by the number of shots at which significant streaking occurred.

Evaluation was an evaluation as percentages relative to the number of shots for a polished object press mold, this being expressed as 100%.

(3) Test Results

The test results of mold durability are illustrated in Table 8, below.

TABLE 8

| Results of Durability Test 3 | | |
| --- | --- | --- |
|  | Press Mold (Punch) | Durability (%) |
| Reference | Polished object | 100 |
| Example | Sample 27 | 286 |

(4) Interpretation of Test Results

The above results have confirmed that a 286% improvement in durability was obtained even for a press mold (punch) manufactured from the cemented carbide of Sample 27.

The hardness (Hv 1400) of the cemented carbide of the base metal of the mold of Sample 27 is a hardness that is approximately the upper limit of base metal hardness used for molds, and so the above results confirmed that the surface treatment method of the present invention is effective for molds of substantially any material.

The invention claimed is:

1. A method of treating a surface of a mold comprising:
    forming dimples on a surface of a mold by ejecting substantially spherical ejection- particles so as to bombard the surface of the mold,
    the dimples being formed so as to satisfy a condition defined by the following formula:

$1+3.3e^{-H/230} \leq W \leq 3+13.4e^{-H/1060}$  Formula (1)

$0.01+0.2e^{-H/230} \leq D \leq 0.01+1.1e^{-H/500}$  Formula (2)

wherein W is an equivalent diameter (μm) of the dimples, D is a depth (μm) of the dimples and H is a base metal hardness (Hv) of the mold.

2. The method of treating the surface of the mold according to claim 1, wherein the dimples are formed by employing ejection particles having a median diameter of from 1 μm to 20 μm as the substantially spherical ejection particles and the ejection particles are ejected at an ejection pressure of from 0.01 MPa to 0.7 MPa such that a dimple-formed surface area is 50% or more of a surface area of the mold surface.

3. The surface treatment method according to claim 2, wherein the ejection particles are ejected against a surface of a mold having a surface roughness adjusted to an Ra of 0.3 μm or less.

4. The surface treatment method according to claim 1, wherein the ejection particles are ejected against a surface of a mold having a surface roughness adjusted to an Ra of 0.3 μm or less.

* * * * *